UNITED STATES PATENT OFFICE.

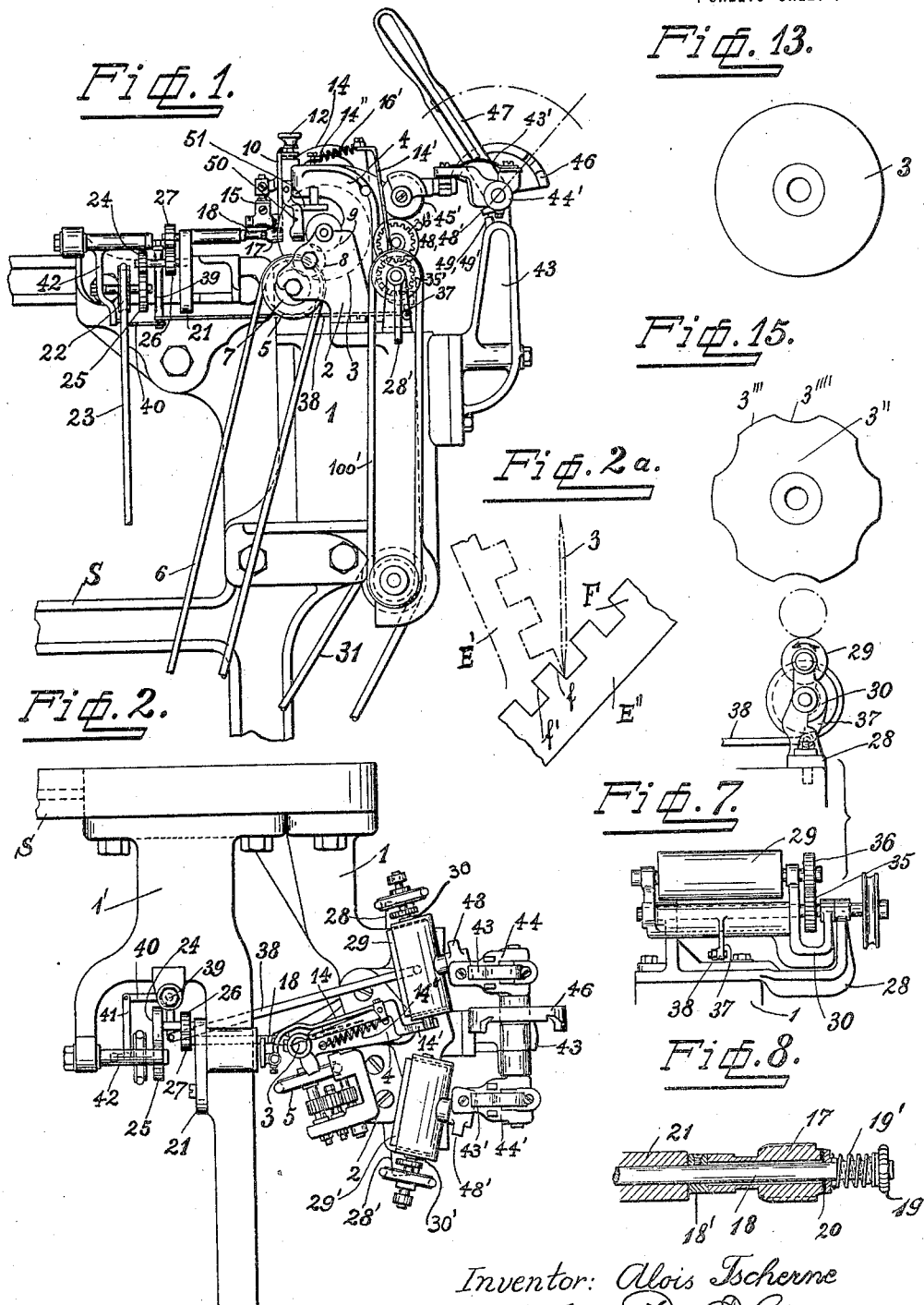

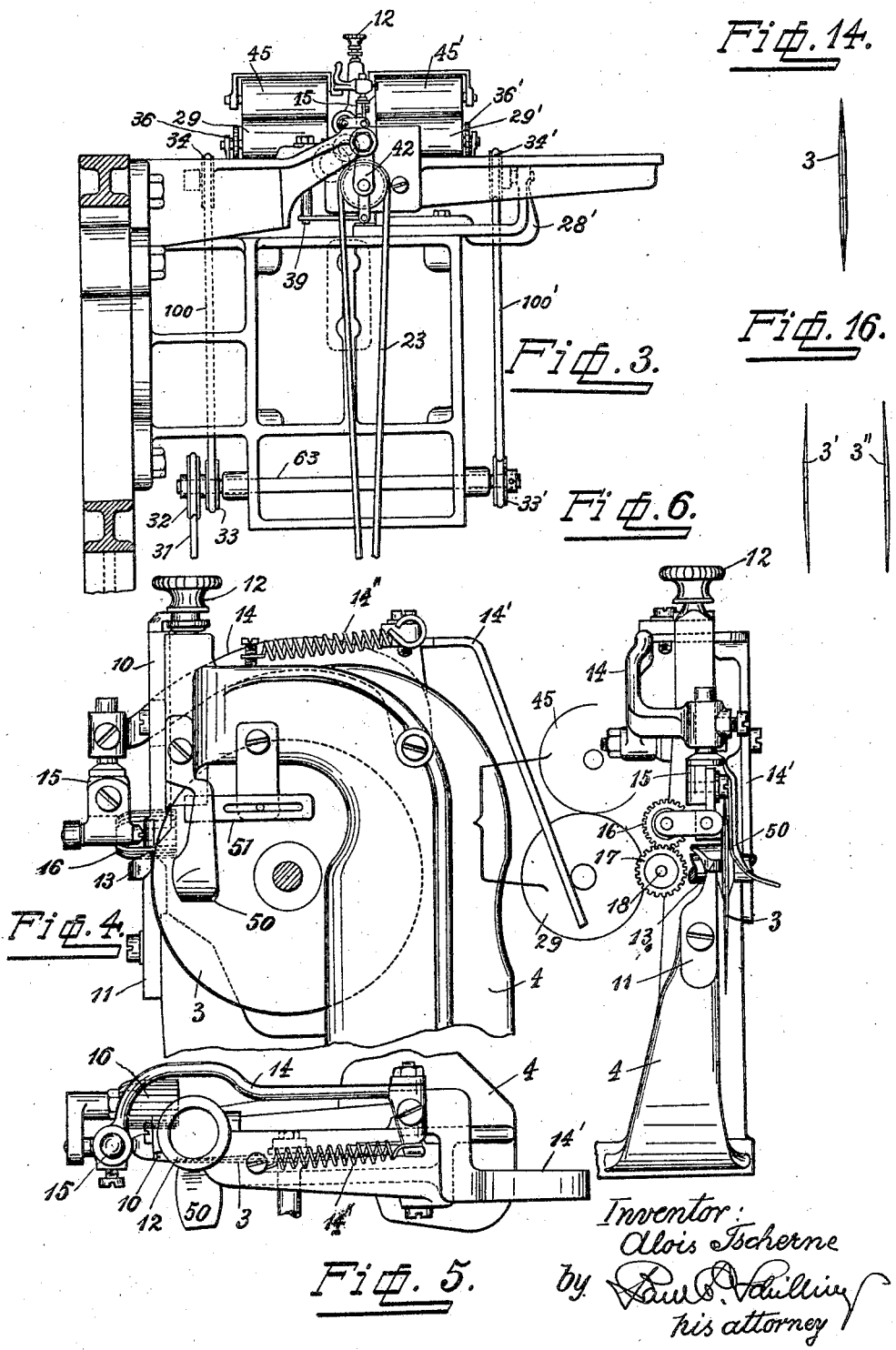

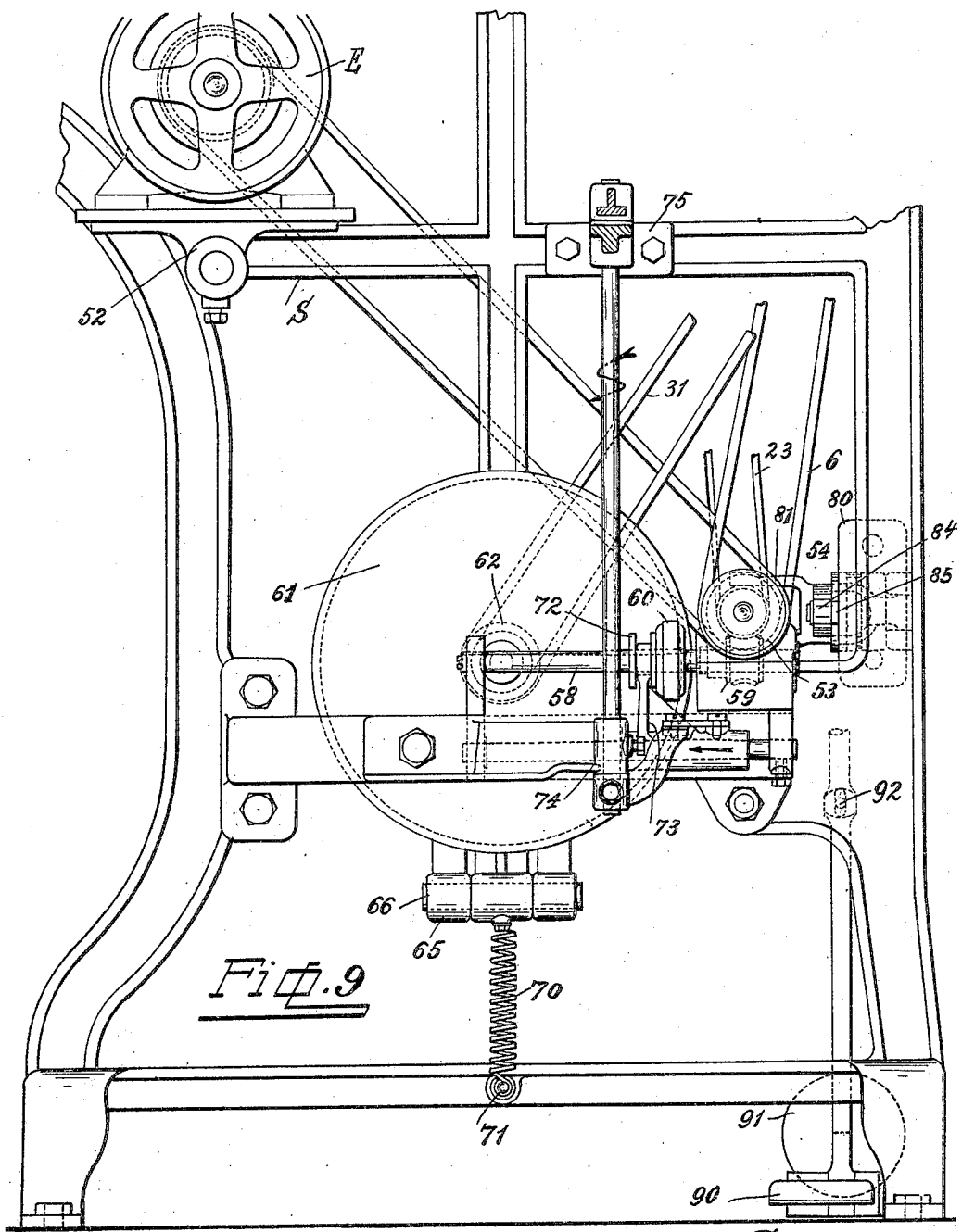

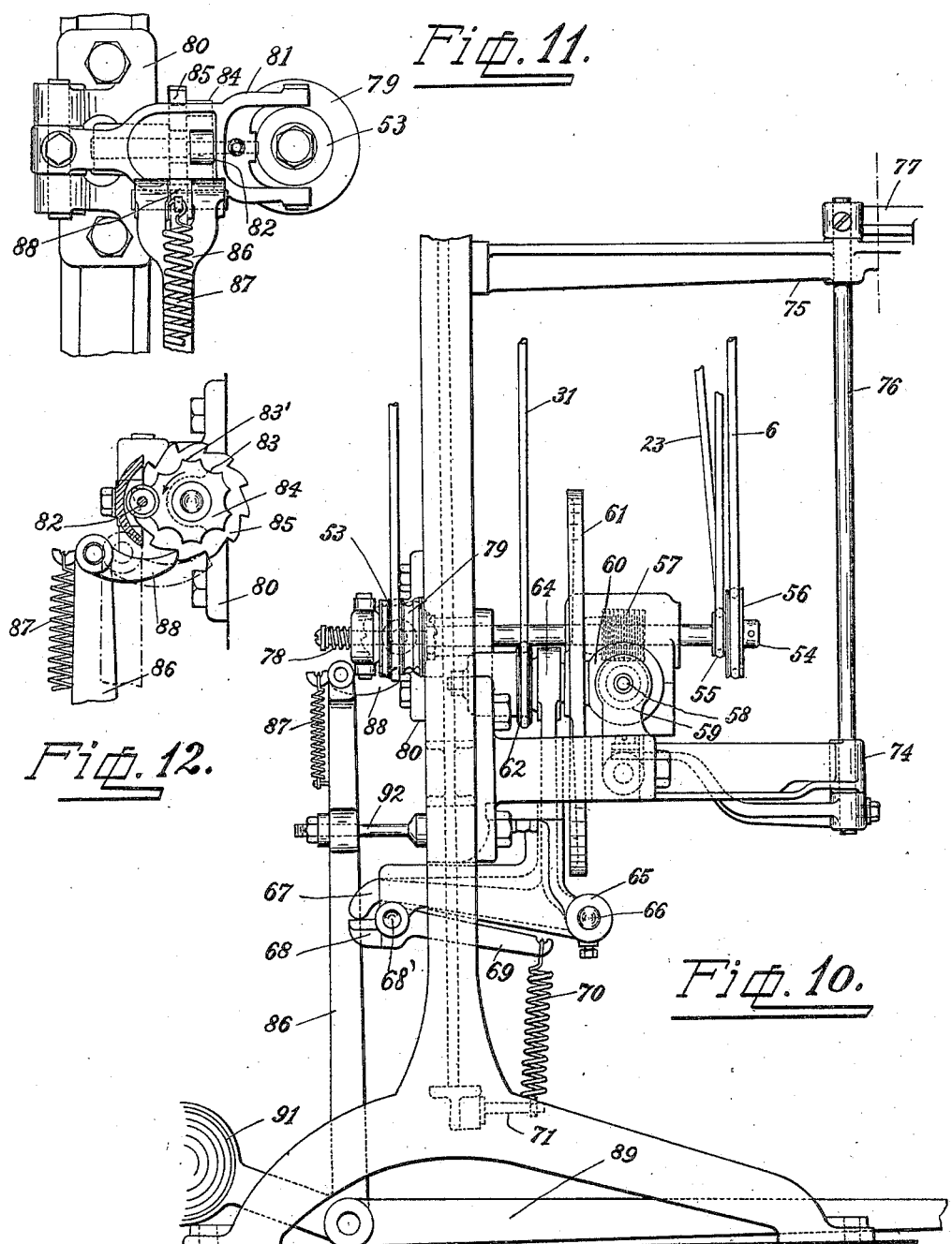

ALOIS TSCHERNE, OF RORSCHACH, SWITZERLAND.

MACHINE FOR CUTTING EMBROIDERY.

1,390,254. Specification of Letters Patent. Patented Sept. 6, 1921.

Application filed October 16, 1920. Serial No. 417,435.

*To all whom it may concern:*

Be it known that I, ALOIS TSCHERNE, a citizen of the Swiss Confederation, and residing at Rorschach, Switzerland, have invented certain new and useful Improvements in Machines for Cutting Embroidery, of which the following is a specification.

The present invention has for its object certain new and useful improvements in machines for cutting embroidery along the embroidery edge.

The primary object of the invention is to provide an embroidery cutting machine with a cutter rotating vertically and same being fulcrumed to a bracket secured tightly to the frame of the machine. By a special form of the cutter its cutting capacity is considerably increased.

Experience taught that, in cutting embroidery, no matter what its form may be, the cutting of ascending edges of say a festoon presents a resistance which is far superior to that arising in cutting descending edges. In order to meet these difficulties a further object of the invention is the provision of pairs of rollers feeding the embroidered as well as the waste portion of the fabric and of which at least the lower one of that pair of rollers which is designed to take up the waste portion can, upon arising of great tension, swing out, thus releasing the tension on said portion and, by means of connecting rods, acting on guide rolls at the same time and exerting influence on said guide rolls, placed in front of the cutter, so as to bring about a prompt and accurate regulation of the feeding of the fabric.

A further object of the invention is to provide a very sensitive friction-clutch as a driving means for the feeding rollers and still a further object is to provide means for instantaneous starting and stopping the machine.

In order to make the invention readily understood I will describe it in detail in connection with the accompanying drawings in which Figure 1 is a fragmentary front elevation of the machine; Fig. 2 is a top view thereof; Fig. 2ª represents a diagram of the cutting operation; Fig. 3 is a side elevation of Fig. 1; Figs. 4, 5, 6, 7 and 8 represent detail parts on a enlarged scale; Fig. 9 is a front view of the driving mechanism, of which Fig. 10 is a side elevation; Figs. 11 and 12 respectively are front and side views of the drive disconnecting mechanism; Fig. 13 is a side view of a plain rim disk knife, of which Fig. 14 is an edge view, and Figs. 15 and 16 respectively show side and edge views of a modification of the disk knife with mutilated periphery.

To the machine frame S is secured a support bracket 1, to which in turn is rigidly secured the bearing 2, in which a disk knife 3 is vertically rotatingly journaled. This circular knife is driven from belt 6 over the pulley 5 and the train of gears 7, 8, 9 and it may consist of a single disk member 3 as shown in Figs. 13 and 14, or it may be composed of two disk members 3', 3" arranged in parallel juxtaposition (Fig. 16), the respective outer faces being slightly convex, and the inner slightly concave, and the two faces of each cutting member converging at the periphery at an acute angle to form a sharp cutting edge. Each disk is peripherally provided with alternate projections 3''' and depressions 3'''' (Fig. 15). As shown there are six such depressions and interposed extensions, but I do not limit myself to this number. The two cutting members 3' and 3" are secured on their shaft with their convex faces facing each other in such a manner that the extensions 3''' of the one member are in horizontal alinement with or overlappingly cover the depressions 3'''' of the other member.

Laterally of the bearing 2 there is provided a support 4 carrying the stop or gate members 10 and 11 which form between them the intake-slit or gate for the embroidery. The gate member 10 can be adjusted by means of the thumb screw 12, while the gate member 11 is rigidly secured to the support 4. This latter gate member is provided with a nose 13 (Figs. 4 and 6) which serves to prevent the fabric from forming folds on introducing the embroidery into the machine, and for facilitating the introduction of the fabric between the gate stops when commencing with the cutting. To the support 4 is fulcrumed the curved rock-lever 14 whose free end extends beyond the knife 3 and the gate members 10 and 11 and carries by the intermediary of a relatively adjustable pin 15 a guide roll 16, which for the purpose of readily feeding-in the fabric can be led over and is preferably dented or roughened on its bearing surface. This roll 16 normally is held in contact with a second guide roll 17 by means of the spring 16' (Fig. 1) but it can be lifted therefrom by swinging the rock lever 14 upwardly, for varying the operative pressure between the two rolls. The two guide rolls 16 and 17 serve to feed the embroidery to the edge tool. The roll 17 is loosely journaled on a shaft 18 (Fig. 8), but can temporarily be coupled thereto by tightening the thumb nut 19 on the shaft end, whereby the helical spring 19' presses against a washer or thrust disk 20 and the latter then forces the roll 17 against the sleeve 18' fixed on the shaft 18. Thus, by adjusting the tension of the spring 19' the rotary speed of the roll 17 can be regulated and thus also the travel of the fabric toward the cutting tool. The shaft 18 is journaled in the bearing 21 fixed to the machine frame and is driven by the friction disks 24 and 25 and the gears 26 and 27 which in turn are driven from the belt drive 22, 23.

In the rear of the cutting tool are provided on the machine frame the supports 28, 28' (Figs. 1, 2, 3 and 7) in which are tiltingly supported the bearings 30, 30' for the rollers 29, 29' which are driven from the belt 31, the rollers 32, 33, 33', 34, 34' and gears 35, 35' and 36, 36' respectively.

From the feeding roller bearing 30, which receives the waste portion of the cut-off embroidery, extends a lever-arm 37 to which is pivotally secured the one end of a draw-rod 38 whose other is connected to the bell-crank-lever 40, fulcrumed on the shaft 39. This bell-crank-lever 40 transmits its motion by means of a link member 41 to the rock lever 42 which carries the friction roller 25. This latter cooperates with the guide roll 17, so that by rocking the roller 29' the guide roll 17 can be let in or out, as the case may be.

If in cutting embroidery strong tension occurs, the feeding of the fabric i. e. its forward motion decreases. This causes a pull on the rollers 29, 45 in such a manner as to draw inwardly the roller 29 together with its tiltingly supported bearing, as indicated by arrow (Fig. 7), this motion causing the lever 37 (Fig. 7) to move also, but in opposite direction. The motion of the lever 37 entrainingly acts upon the draw rod 38, connected to the bell-crank-lever 40, and in its turn causes the lever 42 to swing and to release or interrupt the pressure of the rollers 24 and 25. The pressure between the two rollers being released or interrupted, the rotation of the guide roll 17 ceases or is at least diminished. In order to swing back the roller 29 into its normal position there is provided a suitable spring not specially shown here.

From the curved lever 14, which is influenced by the draw-spring 14" extends slantingly downward, the arm 14', whose lower free end contacts with the swinging roller 29, so that the guide roll 16 is placed under the influence of the movements of this roller 29.

To the machine frame member 1 is further secured a bearing 43 for supporting the carriers 44, 44' for the upper rollers 45, 45' of the respective roller pairs, which roller carriers can be laid over by means of a hand lever 47 coöperating with a cam segment 46. Leaf springs 43' (Figs. 1 and 2) normally press the rollers 45, 45' against the rollers 29, 29', stops 48 coöperating with knobs 49 (Fig. 1) guarding against excess pressure.

In order to draw away from the cutting tool the fabric when cutting along the ascending edges of the embroidery, there is provided on the support 4 a preferably elastice guide member 50, which serves to lift the fabric off the cutting tool and simultaneously gives it a slight twist. By means of a wedge piece 51 the guide member 50 can be adjusted relative to the cutting tool. Instead of this arrangement the guide member 50 could also be connected to the mechanism actuating the guide roll 17, so that the member 50 would then be operated together with the roll 17 on operation of the roller 29.

The machine is driven from an electromotor E (Fig. 9) mounted on a support 52 secured to the machine frame S. The electromotor drives a pulley 53 keyed to the shaft 54, to which latter are secured the grooved pulleys 55 and 56 (Fig. 11), the rollers 55 serving to drive the guide roll 17 by the rope 23 and the roller 56 driving the cutting tool 3 by the rope 6. The shaft 54 further supports a worm 57, meshing with a worm gear 59 keyed on the shaft 58. On this latter is further secured a friction disk 60 which coöperates with a second friction disk 61. With this latter is rigidly secured a pulley 62 which by means of the rope 31 and pulley 32 drives the shaft 63 (Fig. 3) from which in turn the feed rollers are driven.

The friction disk 61 is journaled in the one arm 64 of a bell-crank-lever 64, 67, fulcrumed by its sleeve 65 on a pivot-pin 66 and whose other arm 67 contacts with the shorter arm 68 of a double armed lever, pivoted at 68', to the longer arm 69 of which one end of a draw-spring 70 is secured, whose other end is connected to a pin 71 rigidly secured to the machine frame, with the result that the disk 61 is always pressed against the complementary disk 60, so that the rotation of the shaft 58 is always sure to be transmitted to the disk 61 and thus to the pulley 62. The friction disk 60 can be axially displaced upon its shaft 58, so that the rotary speed of the pulley can be varied. This axial displacement of disk 60 is caused by a mechanism, comprising a hand lever 77 secured to the upper end of the vertical rod 76, to the lower end of which is secured the lever arm 73, whose upstanding free end coöperates with the grooved sleeve 72 fixed to the disk 60. The lever rod 76 is guided in frame members 74 and 75.

In order to be able to start or stop the machine momentarily, the motor-driven pulley 53 is in the form of a loose coupling-half which, by means of a spring 78, is pressed against the complementary disk 79 fixed on the shaft 54. In the machine frame support 80 is journaled a coupling lever 81 secured to the coupling member 53 and carrying a roller 82 adapted to engage in depressions 83, 83′ provided in the periphery of a disk 84 journaled in the machine frame. These depressions alternate in depth, so that the roller 82, depending on the momentary position of the disk 84 engages in them to a larger or lesser degree. The extent of these depressions is so chosen that the coupling lever 81, carrying the roller 82, will let in the coupling when the roller drops into a deep depression 83, while this will not be the case when it engages in the shallow depressions 83′. A ratchet wheel 85 is connected with the recessed disk 84 and can be actuated by a pawl 88 which is pivotally secured to the arm 86 of a bell-crank-lever and is influenced by the draw-spring 87. The other arm 89 of this bell-crank-lever is in the form of a pedal 90 (Fig. 9) the bell-crank normally being retained by a counterbalancing weight 91 in the inoperative position. A stop 92 limits the operative movement of this pedal coupler. If the pedal 90 is stepped on by the operator the ratchet wheel 85 will be advanced by its pawl 88, so that by way of example, the roller may drop into a deep recess 83 of disk 84, when the coupling lever 81 will let in the coupling members 53 and 79, while upon the pedal being again actuated, the roller will engage in the succeeding shallow depression 83′, which prevents the coupling members from couplingly coacting. Since the disk 84 needs only be rotated to a relatively slight degree to cause the roller to change from a deep recess to a shallow one or vice versa, it is clear that this arrangement allows of practically instantaneous starting or stopping of the machine.

The operation of the machine is the following: The fabric to be cut is conducted in between the guide rolls 16, 17 and then through between the gate members 10, 11, to the knife 3 where it is cut, whereupon its severed waste fabric portion E′ (Fig. 2ᵃ) is led in between the rollers 29 and 45 and the severed embroidered portion E″ between the rollers 29′, 45′. After starting the machine by kicking the pedal 90, the embroidery is fed forward by the rollers 29, 29′ and 45, 45′ and is conducted by the guide rolls 16, 17 against the knife 3.

As is well known in the art, the embroidery opposes varying resistances to the cutting operation. The resistance of the ascending edge $f$ of a festoon F is relatively strong, while that of the descending edge $f'$ is rather weak. Thus at the commencement of the cutting of the ascending edge $f$ there is set up a certain tension in the cut-off waste portion E′ which causes the roller 29 to swing around in the direction of the arrow (Fig. 7), with the result that simultaneously the roll 16 is lifted off the roll 17 and the rotation of the latter is slowed down or suspended by the operation of the parts 39, 40, 41, 42, so that also the pull of the guide rolls on the fabric is correspondingly reduced or stopped entirely. If now the descending edge $f'$ is being cut, then the tension in the waste portion diminishes, the roller 29 swings back under the action of a spring not specially shown here, the guide roll 16 again contacts with the roll 17 and the latter is once more rotated more or less rapidly, which increases the degree of pull of the embroidery toward the cutting tool until the succeeding ascending edge $f$ is about to be cut, when the just described operation is repeated.

The rotation of the guide roll 17 can also be influenced by the spring 19 in accordance with the thickness of the fabric, this spring being tensioned for heavy fabrics and eased as desired for light goods.

Such a cutting machine has the advantage that by the described feeding mechanism the embroidery is carried up to the knife automatically and in such a manner, that the cut is executed closely along the cutting edge, so as to produce good and even work. The machine further, can be adjusted readily even during full running for varying thicknesses of fabric and the instantaneous starting and stopping is very important for the machine, especially when handling imperfect goods.

What I claim is:—

1. In a machine of the character described for cutting embroidery along its edge, in combination with the machine frame and a motor, circular cutting means adapted to be vertically rotated by said motor, gate members forming the intake for the fabric to be cut and located directly in front of said circular cutting means, a fold-preventing and fabric-feed facilitating nose on the lower one of said gate members, guide rolls, adapted to feed and guide the fabric to the circular cutter, two pairs of horizontally rotatable feed rollers, located in the rear of the circular cutter, the one of these roller pairs handling the waste fabric portion and the other the embroidered fabric and one roller of at least one of said roller pairs being swingingly arranged, controlling organs operatively connected to said guide rolls and adapted to be operated for controlling the fabric feed, a guide member for drawing away the cut-out embroidery portion from the said gate members and for lifting and twisting it, means for controlling the rotary speed of said feed rollers, and means in connection with the main drive coupling for instantaneously starting or stopping the machine.

2. In the aforeclaimed embroidery cutting machine the feature that the cutting tool is in the shape of a single disk.

3. A machine as claimed in claim 1, characterized by the provision of a double-disk knife as cutting tool.

4. A machine as claimed in claim 3 further characterized by having the said cutting disks peripherally notched at equal intervals.

5. In an embroidery cutting machine of the character set forth in combination with a rotatable shaft a circular cutter comprising two circular disk members having peripheral notches and arranged in parallel juxtaposition on said shaft, said disks being slightly concavo-convex with the concave faces in facing opposition, and the convex faces being peripherally attenuated to form a sharp cutting edge, and said two disks being relatively so disposed that their notches are in relative staggered relation, each notch of the one disk facing an intervening portion between two notches of the other disk.

6. The embroidery cutting machine as claimed in claim 1 characterized in that the rotation of the guide roll 17 is controlled by a spring-controlled thrust disk 20 and the upper guide roll 16 is journaled on a lever 14 whose arm 14' is adapted to be actuated by the swinging roller of the waste fabric handling roller pair.

7. In the embroidery cutting machine as claimed in claim 1 the feature that the lower rollers of the fabric feeding roller pairs are tiltably arranged.

8. In the embroidery cutting machine as claimed in claim 1 the feature that the guide member 50 is elastic and can be adjusted relative to the cutting tool.

9. In the embroidery cutting machine as claimed in claim 8 the feature that a wedge member 51 is provided for pressingly actuating the elastic guide member 50.

10. In the embroidery cutting machine as claimed in claim 1 the feature that the fabric feeding roller pairs are driven by a friction drive.

11. An embroidery cutting machine as claimed in claim 10, characterized by the driving disk of said friction drive being journaled at the upper end of a bell crank, and the other free end of said bell crank cooperating with the shorter arm of a double-armed spring-influenced lever.

12. An embroidery cutting machine as claimed in claim 1, characterized by a foot operated starting and stopping lever, a coupling lever operated by said foot lever and adapted to control the main drive coupling, a roller journaled in said coupling lever, a rotatable ratchet wheel, a pawl adapted to cooperate with said ratchet wheel and fulcrumed on said foot lever, and a disk having peripheral notches of alternately varying extent, said disk being rigidly connected to said ratchet wheel and adapted to peripherally cooperate with said roller.

In witness whereof I have hereunto set my name.

ALOIS TSCHERNE.